United States Patent [19]

Shtrikman

[11] 4,326,138
[45] Apr. 20, 1982

[54] HAIR CUTTING APPARATUS

[75] Inventor: Shmuel Shtrikman, Rehovot, Israel

[73] Assignee: Yeda Research & Development Co., Ltd., Rehovot, Israel

[21] Appl. No.: 118,966

[22] Filed: Feb. 5, 1980

[30] Foreign Application Priority Data

Feb. 8, 1979 [IL] Israel ........................................ 56623

[51] Int. Cl.³ ............................................. H02K 33/06
[52] U.S. Cl. ......................................... 310/36; 310/38; 30/45
[58] Field of Search ............................. 310/24, 36-39; 30/43, 45

[56] References Cited

U.S. PATENT DOCUMENTS 3,493,793  2/1970  Niemela ................................. 310/29
3,505,545  4/1970  Bey ..................................... 310/36 X
3,538,358  11/1970  Baüerle ............................... 310/36 X

FOREIGN PATENT DOCUMENTS 7808 of 0000 Israel .
651083  3/1951  United Kingdom .
770479  3/1957  United Kingdom .
829782  3/1960  United Kingdom .
1138020  12/1968  United Kingdom .
1255808  12/1971  United Kingdom .

Primary Examiner—Donovan F. Duggan
Attorney, Agent, or Firm—Browdy and Neimark

[57] ABSTRACT

Hair cutting apparatus comprising a housing; an AC electromagnet fixed in the housing and defining a gap; at least one permanent magnet disposed for reciprocating motion in the gap; a mounting member pivotally mounting the at least one permanent magnet about an axis fixed in the housing; and apparatus for drivingly connecting the mounting member to a hair cutting head for reciprocal motion of cutting apparatus in the cutting head in response to reciprocating motion of the at least one permanent magnet in the gap.

4 Claims, 7 Drawing Figures

HAIR CUTTING APPARATUS

The present invention relates to electrically operated hair cutting apparatus such as shavers and hair clippers and more particularly to hair cutting apparatus employing reciprocal motion.

There are known various types of reciprocating electrically operated hair cutting apparatus. This apparatus, when designed to operate in reciprocating motion, normally comprises a fixed electromagnet which produces a magnetic field and an iron armature for reciprocating motion therein, the armature being fixed to a level arm which operates the cutting blades of the shaver or hair clipper. Hair cutting apparatus which employs a moving iron armature often displays a relatively high level of vibration and operating noise and draws a relatively large amount of current.

The present invention seeks to provide hair cutting apparatus which lowers the vibration and noise levels encountered during operation and significantly decreases the current requirements of the operating mechanism.

There is thus provided in accordance with an embodiment of the present invention hair cutting apparatus comprising a housing, an AC electromagnet fixed in the housing and defining a gap, a cutting head associated with the housing and having a driving member arranged to be driven in reciprocal motion for operation of the cutting head; at least one permanent magnet disposed for reciprocal motion past said gap, a mounting member for pivotably mounting the at least one permanent magnet onto the housing, and apparatus for drivingly connecting the permanent magnet to the driving member for operation of the cutting head in response to AC energization of the electromagnet.

Further in accordance with an embodiment of the present invention, a pair of oppositely magnetized permanent magnets is employed. Additionally in accordance with an embodiment of the present invention, the magnets are relatively planar and are disposed with their plane in the plane of pivotal motion. The magnetization of the magnets is along an axis perpendicular to the plane of motion.

According to an alternative embodiment of the invention the gap is arranged such that the AC magnetic field lies in the plane of pivotal motion and the magnets are arranged along a plane perpendicular to the plane of motion.

The mounting member may be pivotably mounted onto the housing at a location between the magnets and the driving member or alternatively at a location at the other side of the magnet from the driving member. As a further alternative, the mounting member may have two symmetrical branches, each of which supports one or more permanent magnets in a respective gap.

The invention will be more fully understood and appreciated from the following detailed description taken in conjunction with the drawings in which.

Figure 1:
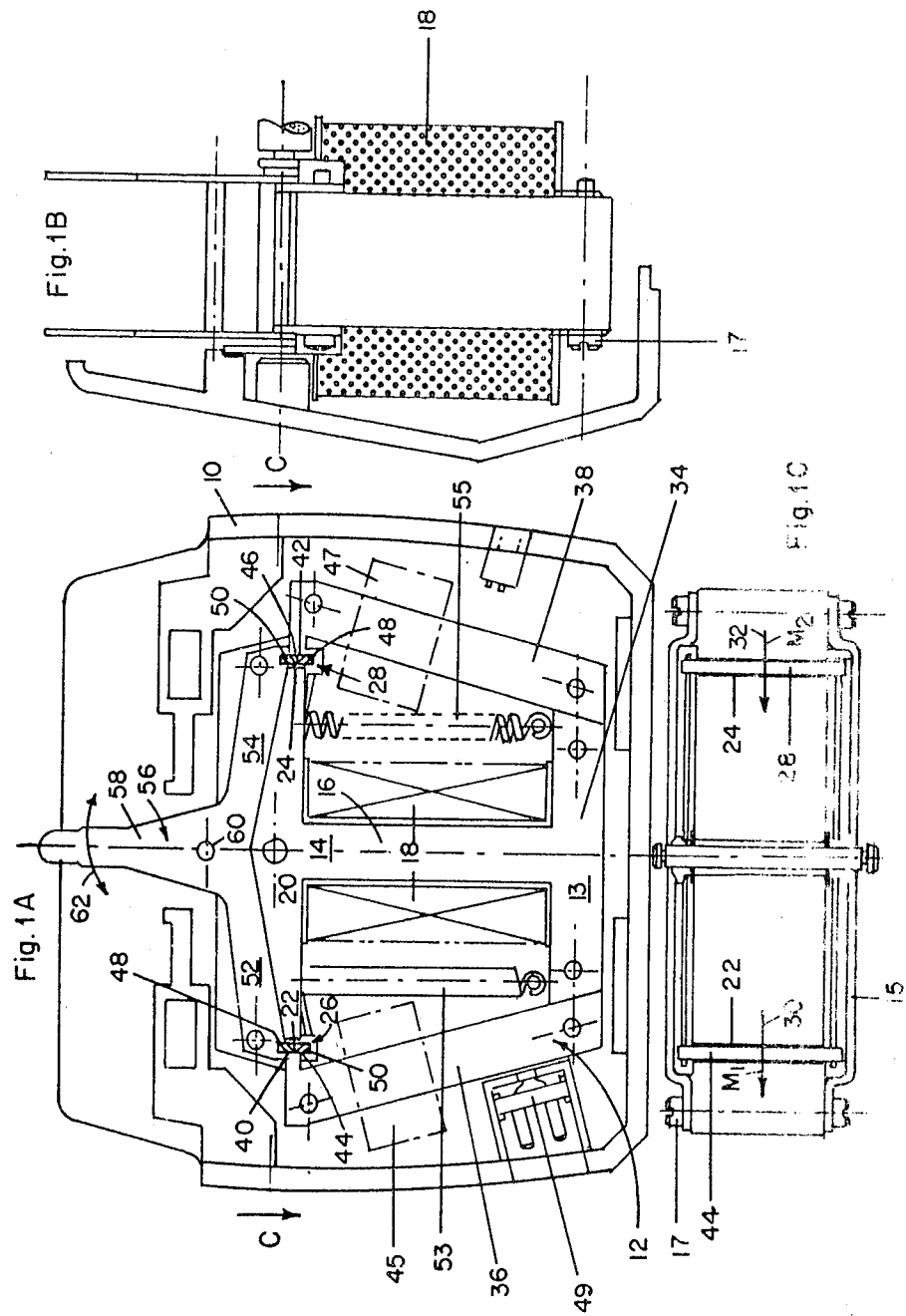
FIGS. 1A, 1B and 1C are schematic sectional illustrations of a shaver constructed and operative in accordance with an embodiment of the present invention.

Referring now to FIGS. 1A, 1B and 1C there is seen in schematic sectional illustration a partially disassembled shaver constructed and operative in accordance with an embodiment of the present invention. For the sake of clarity, the shaver head has been removed. The shaver head is entirely conventional and may be the shaver head of a Schick shaver.

Figure 4:
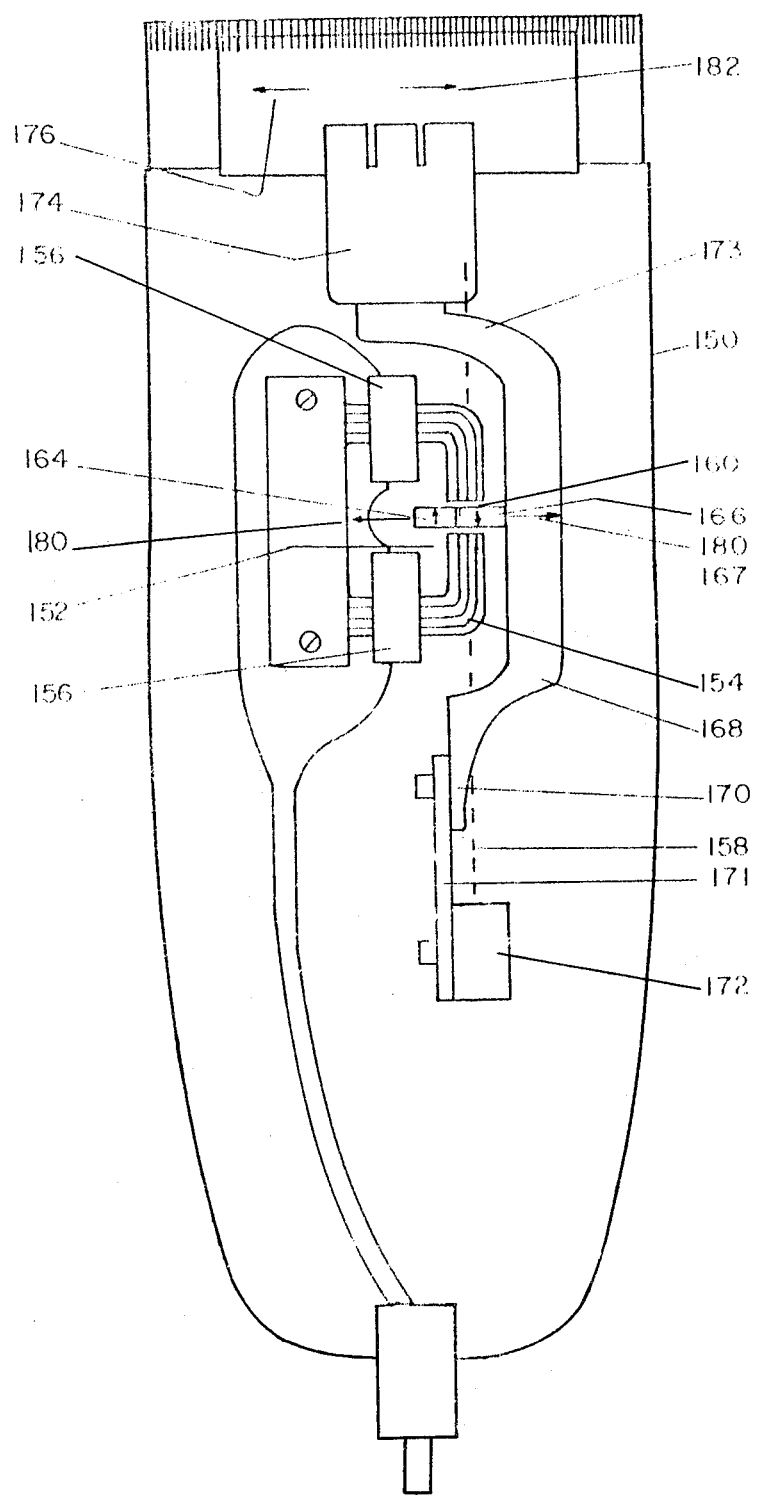
FIG. 4 is a pictorial top view illustration of a hair clipper constructed and operative in accordance with an embodiment of the present invention.

A similar shaver head is exemplarily illustrated in FIG. 4.

The illustrated shaver comprises a housing 10 in which there is disposed an AC electromagnet indicated generally by reference numeral 12. The AC electromagnet comprises a core 13 formed of soft iron and secured together by exterior joining members 15 and screws 17. The configuration of the core is illustrated in the drawing and comprises a T-shaped central member 14 having a post 16 which is surrounded by a wound coil 18 and a cross member 20 which narrows as it extends outwardly from the post 16 and whose extreme ends 22 and 24 define one side of respective first and second gaps 26 and 28 across which there are produced respective magnetic fields indicated by $M_1$ and $M_2$ along axes 30 and 32.

Post 16 terminates in a bottom cross member 34 which is fixedly attached at its extreme ends to side members 36 and 38 whose respective ends 40 and 42 terminate in spaced confronting relationship with respective ends 22 and 24 to define first and second gaps 26 and 28.

Side coils 45 and 47 are disposed about respective side members 36 and 38. Coils 45 and 47 and coil 18 are both electrically connected by wires (not shown) to a connector 49.

Permanent magnet pairs 44 and 46 are disposed for reciprocating generally up and down motion in respective gaps 22 and 24. Each pair comprises first and second magnets 40 and 50, magnetized in opposite directions along the axis of the magnetic field in the gap.

Magnet pairs 44 and 46 are mounted on opposite branches 52 and 54 of a mounting member 56 which also has a driving branch 58 which operatively engages the shaver head (not shown) for driving thereof in reciprocal motion. Mounting member 56 is pivotably mounted for relatively free rotation about a pivot axis 60 fixed in the housing.

Branches 52 and 54 are connected via springs 53 and 55 to locations fixed with respect to the core 13, in order to provide restoring forces.

It is noted that since the magnetization directions of the magnets in the pairs 44 and 46 are opposite, at any point in time during which there is present a magnetic field in gaps 22 and 24, one of the magnet pairs will be pulled downward while the other will be pushed upward. The complementary motion of the two magnet pairs under AC operation of the electromagnet causes the driving branch to move in reciprocal motion as indicated by arrows 62.

Figure 2:
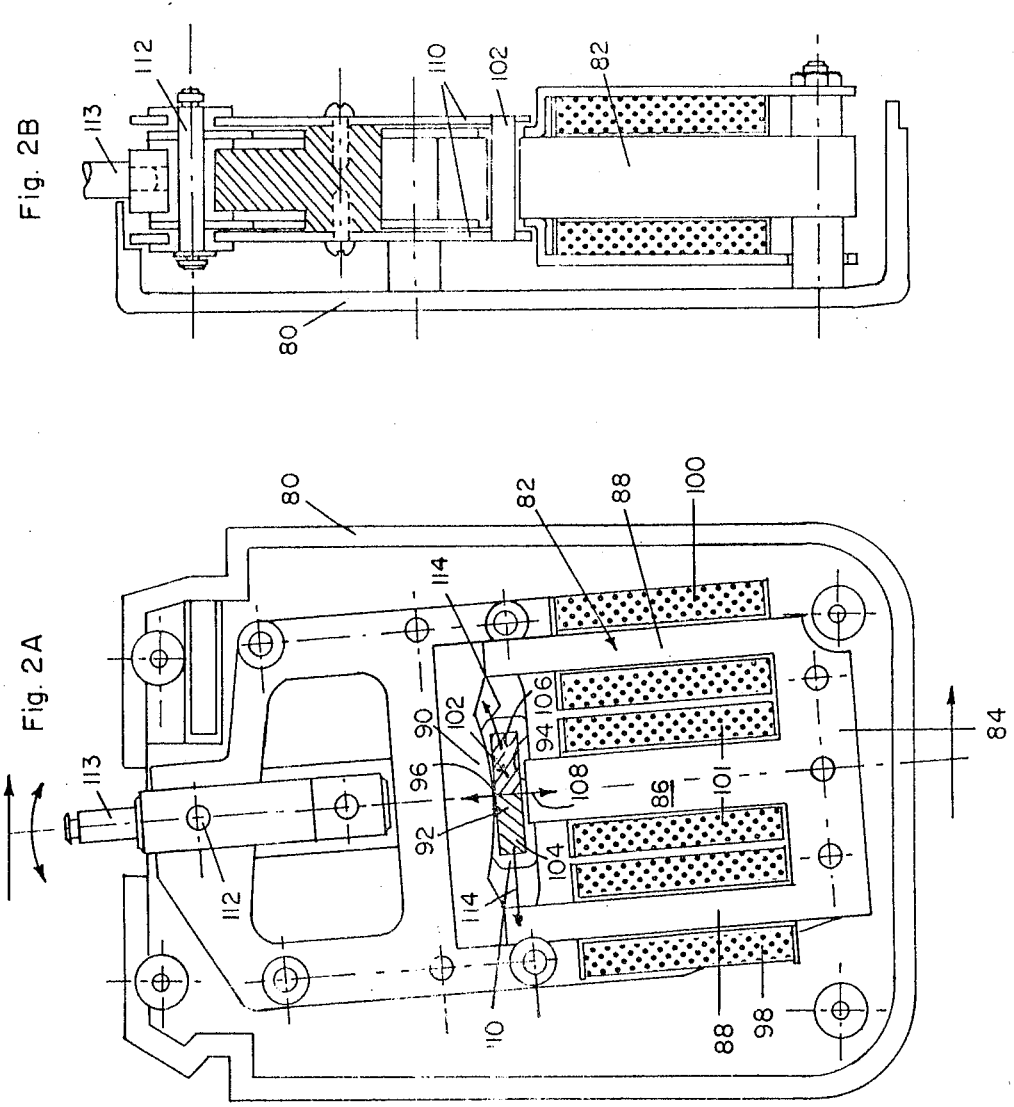
FIG. 2A is a schematic sectional illustration of a shaver constructed and operative in accordance with an alternative embodiment of the present invention.
FIG. 2B is a side sectional illustration of the shaver of FIG. 2 taken along the lines III—III of FIG. 2A.

Reference is now made to FIGS. 2A and 2B which illustrate a shaver constructed and operative in accordance with an alternative embodiment of the present invention. The shaver comprises a housing 80 having fixedly disposed therein an AC electromagnet 82 comprising a core 84, typically formed of a plurality of sheets of soft iron, and having a central post 86, a pair of side posts 88 and a top member 90. A gap 92 is defined between the top surface 94 of central post 86 and a lower surface 96 of the top member. Wound coils 98 and 100 are disposed about the side posts and a wound coil is disposed about central post 86 and all of the coils are connected to an AC power source for operating the electromagnet.

Disposed for motion in gap 92 is a magnet pair 102 comprising first and second permanent magnets 104 and 106, having their magnetization in respective opposite directions along an axis 108, along which the magnetic field of electromagnet 82 is directed at gap 92. Magnets 104 and 106 are mounted in close-side by side engagement on a mounting member 110 which is pivotably mounted at an axis 112 for relatively unimpeded rotation relative to the housing. The extreme end of the mounting member opposite the magnet pair 102 is a driving element 113 arranged for driving engagement with a shaver head (not shown).

The motion of the magnet pair 102 in the gap 92 is reciprocating and is generally as indicated by arrows 114. Due to the placement of the pivot axis 112 closer to the driving element 113 than to the magnet pair 102, the motion of the magnet pair in gap 92 produces a smaller amplitude reciprocating motion of driving element 113 as indicated by arrows 116.

Figure 3:
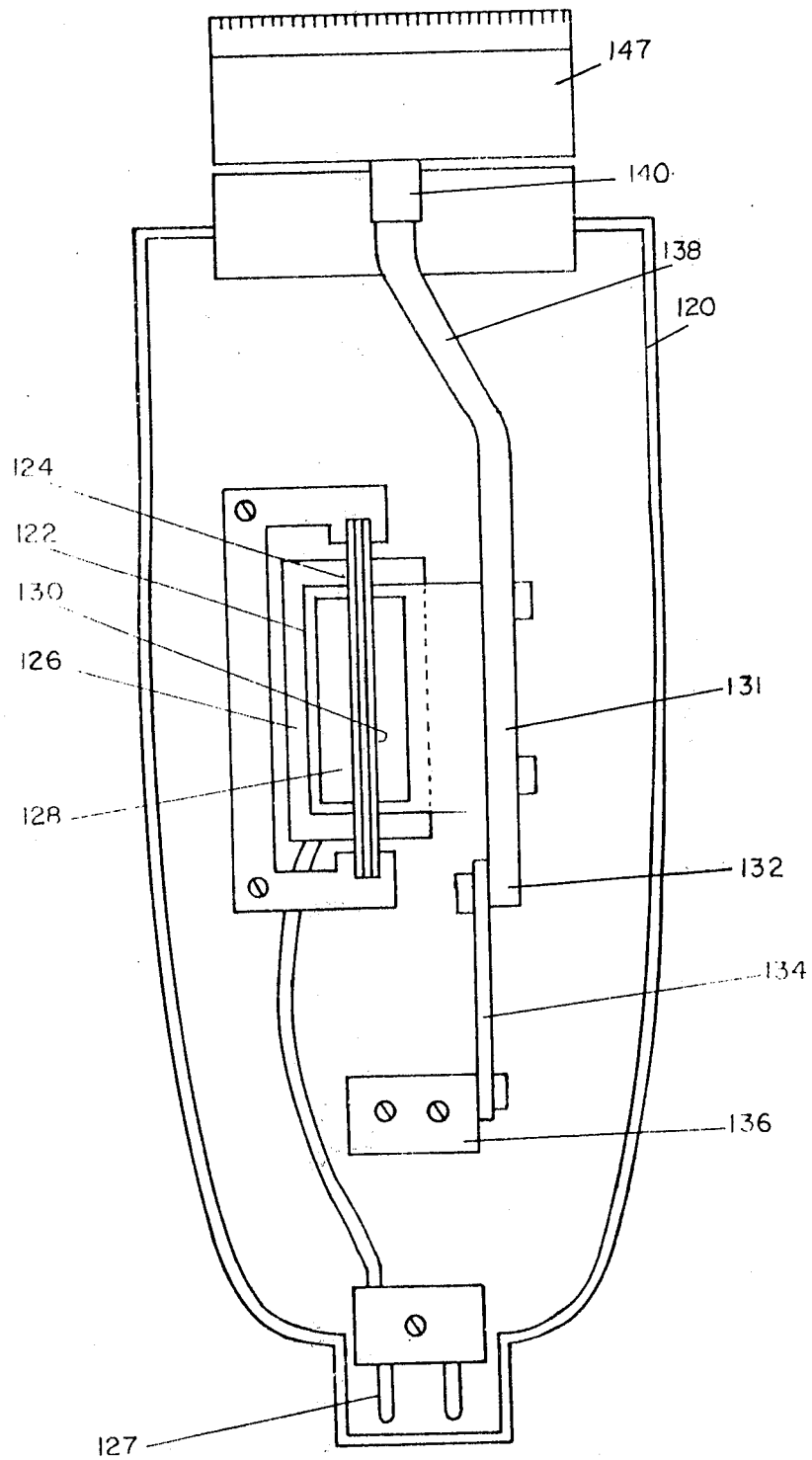
FIG. 3 is a pictorial top view illustration of a shaver constructed and operative in accordance with still another alternative embodiment of the present invention.

Reference is now made to FIG. 3 which shows in pictorial illustration, a shaver constructed and operative in accordance with still another embodiment of the invention. The shaver comprises a housing 120, half of which has been removed to show the interior. Fixedly mounted in housing 120 is an AC electromagnet 122 comprising a core 124 formed of a plurality of sheets of soft iron about which is wound a coil 126 connected to electrical connectors 127.

A magnet pair 128 is disposed for reciprocating motion in the plane of the drawing relative to a gap 130 defined by core 124. It is noted that the plane of the magnet pair 128 is the same as the plane of the reciprocating motion in the gap and perpendicular to the axis of the magnetic field produced by the electromagnet 122 across the gap.

The magnet pair 128 is mounted on a mounting member 131 which is connected at a first end 132, as by a leaf spring 134 to a fixed base 136 securely attached to the housing. The spring mounting provides a required pivotal mounting for the magnet pair and serves to urge the magnet pair to a middle position. At end 138 of the mounting member 130, opposite to end 132 is attached to a driving element 140 which is attached to a moving blade assembly (not shown) in a shaver head 142.

In the illustrated embodiment, since the pivotal mounting is at an extreme end of the mounting member, the amplitude of motion of the driving element 140 is greater than the amplitude of motion of the magnet pair in gap 130.

Reference is now made to FIG. 4 which illustrates a hair clipper constructed and operative in accordance with an embodiment of the invention. The hair clipper comprises a housing 150 in which is fixedly mounted an AC electromagnet 152 comprising a core 154 which is wound with coils 156 which are in turn connected to an electrical power source (not shown). In contrast to the shaver illustrated in FIG. 4 in which the magnetic field produced by the electromagnet is perpendicular to the plane of intended reciprocal motion, here, the electromagnet is arranged so as to produce a magnetic field along an axis 158 which lies in the plane of intended reciprocal motion and perpendicular to the pivot axis of the permanent magnet which moves relative to the electromagnet.

Electromagnet 152 defines a gap 160 in which is disposed for reciprocating motion relative thereto a magnet pair 162 comprising magnets 164 and 166 with magnetization in opposite directions along axis 158 and disposed in side by side orientation on a mounting member 168.

Mounting member 168 is mounted at a first end 170 as by a leaf spring 171 onto a fixed location 172 in the housing 150, and is attached at an opposite end 173 to a driving element 174 which operates a moving cutting element 176 in a cutter head 178.

It is appreciated that the leaf spring mounting at end 170 provides both a pivotal mounting and a resilient return of the magnet pair 162 to a midpoint equilibrium position therein. AC energization of the electromagnet causes magnet pair to vibrate along a path indicated by arrows 180 at a selected amplitude and thus results in vibrational movement of driving element 174 along arrows 182 at a proportionately greater amplitude determined by the level arm length ratio from the pivot location 172.

The invention is not limited to what has been specifically shown and described hereinabove. Rather, the scope of the invention is defined only by the claims which follow:

I claim:

1. Hair cutting apparatus comprising:
   a housing;
   an AC electromagnet fixed in said housing and defining a fixed gap between facing stationary pole pieces thereof;
   a pair of oppositely magnetized permanent magnets arranged in side-by-side arrangement disposed for reciprocating motion in said gap and between said stationary pole pieces;
   a mounting member pivotally mounting said pair of oppositely magnetized permanent magnets about an axis fixed in said housing; and
   apparatus for drivingly connecting said mounting member to a hair cutting head for reciprocal motion of cutting apparatus in the cutting head in response to reciprocating motion of said at least one permanent magnet in said gap.

2. Hair cutting apparatus according to claim 1 and wherein said pair of permanent magnets are generally planar and are arranged in the plane of said pivot axis.

3. Hair cutting apparatus according to claim 1 and wherein said pair of permanent magnets are generally planar and arranged perpendicular to said pivot axis.

4. Hair cutting apparatus according to claim 1 and wherein the magnetization of said pair of permanent magnets is along an axis perpendicular to the plane of the pair of permanent magnets.

* * * * *